United States Patent [19]
Neu

[11] Patent Number: 5,248,422
[45] Date of Patent: Sep. 28, 1993

[54] PROCESS FOR TREATING WASTEWATER TO REMOVE BOD AND NUTRIENTS

[76] Inventor: Kenneth E. Neu, 3325 Mount La., Hubertus, Wis. 53033

[21] Appl. No.: 890,749

[22] Filed: May 28, 1992

[51] Int. Cl.$^5$ .............................................. C02F 3/08
[52] U.S. Cl. .................................. 210/605; 210/619; 210/626; 210/903; 210/906
[58] Field of Search .............. 210/605, 614, 619, 626, 210/903, 906

[56] References Cited

U.S. PATENT DOCUMENTS

| | | | |
|---|---|---|---|
| Re. 32.429 | 6/1987 | Spector | 210/605 |
| 3,817,857 | 6/1974 | Torpey | 210/3 |
| 3,869,380 | 3/1975 | Torpey | 210/17 |
| 3,871,999 | 3/1975 | Torpey | 210/16 |
| 3,915,854 | 10/1975 | Torpey | 210/17 |
| 4,093,539 | 6/1978 | Guarino | 210/17 |
| 4,126,545 | 11/1978 | Hagiwara | 210/619 |
| 4,663,044 | 5/1987 | Goronszy | 210/619 |
| 4,721,570 | 1/1988 | Ankaitis | 210/619 |

FOREIGN PATENT DOCUMENTS 55-35964  3/1980  Japan ..................... 210/619

*Primary Examiner*—Thomas Wyse

[57] ABSTRACT

A BOD-containing wastewater also containing unacceptable levels of phosphorous, nitrogen or mixtures thereof is introduced into and mixed with recycled activated sludge in a first aeration zone including at least one partially submerged rotatable biological contactor under conditions whereby the overall dissolved oxygen content of the mixed liquor in the first aeration zone is about 0.7 to about 1.5 mg/l so as to cause microorganisms capable of storing phosphates under oxidizing conditions to release soluble phosphates into the mixed liquor, the mixed liquor from the first aeration zone is transferred to a subsequent aeration zone and aerated under conditions whereby the overall dissolved oxygen content of the mixed liquor is greater than about 1.5 mg/l so as to cause storing of phosphates by phosphate-storing microorganisms, the mixed liquor from the subsequent aeration zone is transferred to a settling zone wherein a clarified supernatant liquid is separated from settled sludge containing phosphate-storing phosphate-storing microorganisms, at least a portion of the settled sludge is recycled to first aeration to provide the desired amount of suspended solids. A portion of the phosphorous-rich solids is wasted to maintain the phosphate content in the clarified effluent below a predetermined level.

14 Claims, 1 Drawing Sheet

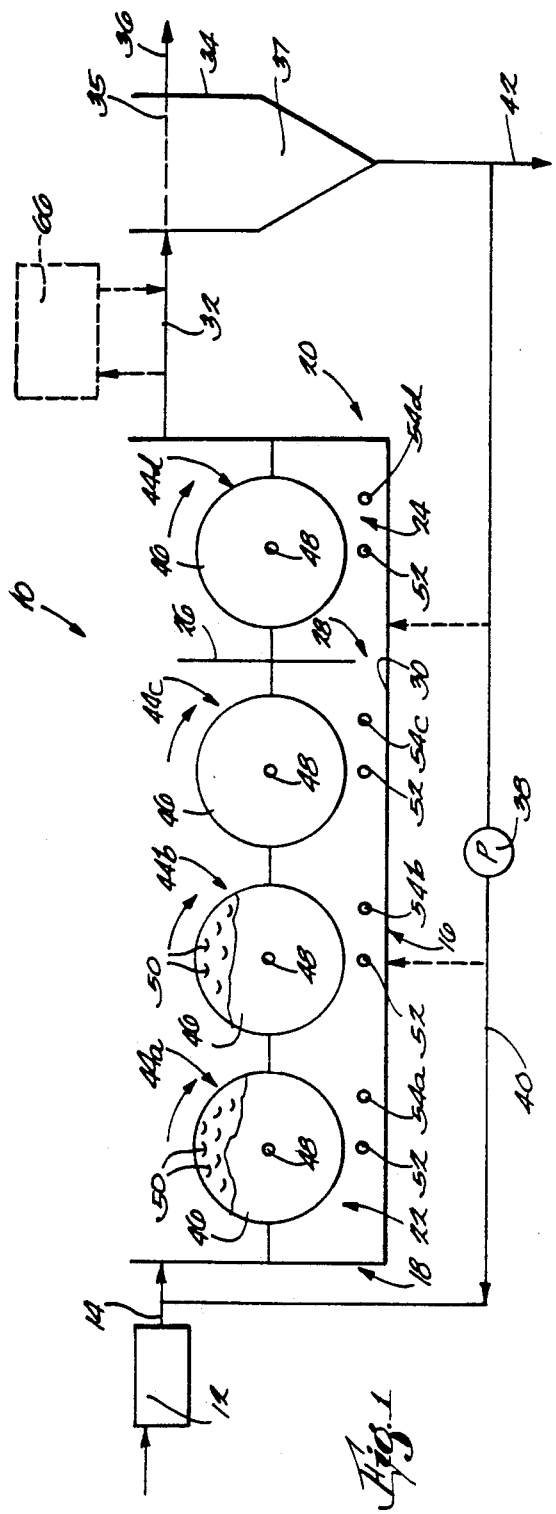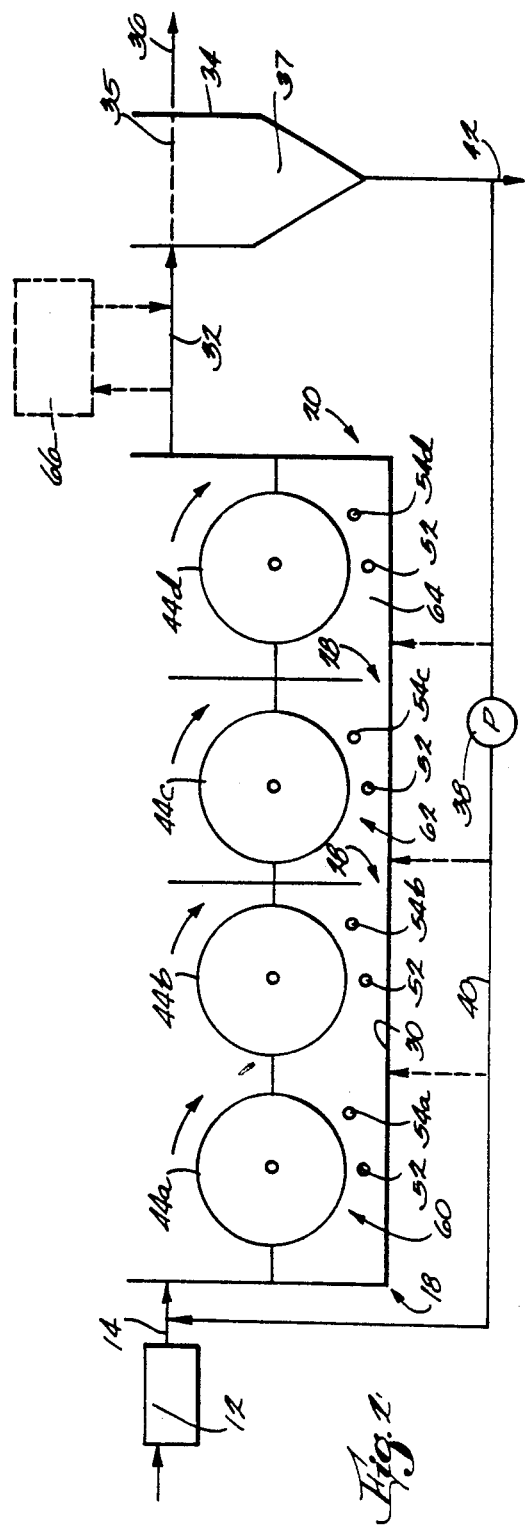

PROCESS FOR TREATING WASTEWATER TO REMOVE BOD AND NUTRIENTS

BACKGROUND OF THE INVENTION

I. Field of the Invention

This invention relates to processes for treating BOD-containing wastewaters, such a municipal sewage, industrial wastewaters and the like and, more particularly, to such processes which are capable of removing both BOD and nutrients, i.e., phosphorous and/or nitrogen, from wastewaters.

II. Prior Art

Activated sludge processes have been used for some time to remove biological oxygen demand (BOD) from municipal sewage, industrial wastewaters and the like. In such a process, a wastewater influent is mixed with a microorganism-containing recycled biomass or activated sludge in an initial contact zone to form a mixed liquor. At some point in the process, the mixed liquor is aerated with sufficient oxygen to grow and maintain a satisfactory population of microorganisms which sorb, assimilate and metabolize the BOD of the wastewater.

Spector U.S. Pat. No. Re. 32,429 discloses an activated sludge process for biologically removing phosphorous. In this process the wastewater and recycled activated sludge are mixed in an initial contact zone from which air is excluded and the mixed liquor is subsequently treated in one or more aeration or aerobic zones before being clarified to separate an activated sludge. The initial contact zone is maintained in the absence of externally supplied oxygen and under conditions where the nitrite and/or nitrate concentration ($NO_x-$) is less than 0.3 ppm, preferably less than 0.2 ppm, and the dissolved oxygen content (DO) supplied by the wastewater influent and recycled sludge is less than 0.7 ppm, preferably less than 0.4 ppm. Such low DO levels in the anaerobic zone are achieved by introducing nitrogen gas to strip the mixed liquid of any dissolved oxygen and prevent entry of oxygen from the atmosphere. The $NO_x-$ concentration in the anaerobic zone is maintained at such levels by avoiding introduction of mixed liquor from an aerobic zone and controlling the $NO_x-$ concentration in the recycled sludge. To provide denitrification, three treatment zones are used, an above-described anaerobic zone, an anoxic zone in which the DO is in excess of 0.7 ppm, the $NO_x-$ concentration is in excess of 2 ppm and the nitrites and/or nitrates are reduced to nitrogen gas and an aerobic zone in which oxygen is introduced to oxidize BOD and effect phosphate uptake. A portion of the mixed liquor from the aerobic zone is recycled to the anoxic zone to maintain the $NO_x-$ concentration in the anoxic zone at the desired level.

Another type secondary treatment process employs so-called rotating biological contactor (RBC) units in the form of a plurality of plastic disks which are relatively densely packed on a shaft but spaced apart to form a cylinder. The disks provide surfaces for the growth of a biomass. The RBC units typically are located to be rotated partially submerged in a treatment tank containing wastewater so that the surfaces are alternately exposed to the wastewater and to oxygen in the ambient air. A film of wastewater is carried into the air and trickles down the surfaces of the RBC's while absorbing oxygen from the air. Organisms in the biomass remove dissolved oxygen and organic materials from the film of wastewater and unused dissolved oxygen in the film is mixed with the contents of the mixed liquor in the treatment tank. Such systems typically employ a single pass flow and phosphorous removal is accomplished by adding a chemical to the last RBC stage. Some single pass systems employ a carbon source, such as methanol, for nitrogen removal and a chemical coagulant for phosphorous removal.

Lorpey U.S. Pat. Nos. 3,817,857 and 3,869,380 disclose processes for removing carbonaceous and nitrogenous materials from wastewaters including a single stage treatment unit employing RBC units and a denitrifying unit employing RBC units located upstream of the treatment unit. The denitrification unit is supplied wastewater and recirculated effluent from the treatment unit. There is no recirculation of sludge from the final clarifier to the treatment unit. Such processes do not remove phosphorous effectively.

Lorpey U.S. Pat. No. 3,871,999 discloses a single pass, two stage process employing RBC units in both stages. The first stage is operated to remove most of the BOD and convert a small portion (less than 50%) of the ammonia nitrogen into nitrates and nitrites and produce an effluent containing nitrogen in the form of nitrates and ammonia nitrogen. The second stage is operated with the exclusion of molecular oxygen to provide an oxygen deprived atmosphere which forces a biochemical conversion of substantially all the remaining ammonia nitrogen into nitrogen gas. This process does not employ recycled sludge and does not remove phosphorous effectively.

Lorpey U.S. Pat. No. 3,915,854 discloses that existing activating sludge processes can be upgraded by adding a single stage biological treatment step employing RBC units between an activated sludge treatment tank and the final clarifier, thereby eliminating the need to recycle activated sludge from the final clarifier to the activated sludge treatment tank.

Guarino U.S Pat. No. 4,093,539 discloses that the BOD removal efficiency of an activated sludge system can be improved by adding partially submerged RBC units to the aeration tanks. The process otherwise is operated as a conventional recycled activated sludge process which typically has a hydraulic retention time of 6–12 hours. This patent is concerned primarily with BOD removal and ammonia conversion (nitrification) and does not specifically address removal of nitrites and/or nitrates (denitrification) or removal of phosphorous.

Ankaitis U.S. Pat. No. 4,721,570 discloses that the settleability of suspended wastewater solids in a treatment system employing RBC units in a series of separate compartments in an elongated treatment tank can be enhanced by maintaining the last compartment at the effluent end of the tank at a DO of at least 0.5 mg/l and recycling sludge from the final clarifier to the effluent end of the tank, instead of the influent end of the tank. This patent does not address removal of either phosphates or nitrogen.

Applicant is unaware of any prior RBC wastewater treatment process which is capable of also biologically removing phosphorous or both phosphorous and nitrogen. Such a process is particularly desirable for existing RBC installations subject to governmental agency regulations requiring reduced phosphorus or phosphorous and nitrogen concentrations in the final effluent.

SUMMARY OF THE INVENTION

An object of this invention is to provide a wastewater treatment process employing rotating biological contactors which is capable of biologically removing phosphorous or both phosphorous and nitrogen without use, or at least minimal use, of a supplemental carbon source or a chemical coagulant.

Another object of the invention is to provide such a process which includes recycling activated sludge to the influent end of the process but does not require special control of the nitrite and/or nitrate concentration in recycled activated sludge.

A further object of the invention is to provide such a process which can be retrofitted into existing RBC systems or incorporated into new RBC systems with a minimum amount of additional equipment.

Other objects, aspects and advantages of the invention will become apparent to those skilled in the art upon reviewing the following detailed description, the drawing and the appended claims.

The invention provides a process for treating a BOD-containing wastewater also containing unacceptable levels of phosphorous, nitrogen or mixtures thereof in which a wastewater influent and recycled activated sludge are introduced into a first aeration zone including at least one partially submerged rotatable biological contactor to produce a mixed liquor and the mixed liquor is forcibly aerated by rotating the contactor under conditions whereby the overall dissolved oxygen content of the mixed liquor in the aeration zone is about 0.7 to about 1.5 mg/l so as to cause microorganisms capable of storing phosphates under oxidizing conditions to release soluble phosphates into the mixed liquor. The mixed liquor is transferred from the first aeration zone to a subsequent aeration zone where it is aerated under conditions whereby the overall dissolved oxygen content of the mixed liquor in the subsequent aeration zone is greater than about 1.5 mg/l so as to cause storing of phosphates by the phosphate-storing microorganisms.

The mixed liquor is transferred from the subsequent aeration zone to a settling zone where a clarified supernatant liquid is separated from settled sludge containing the phosphate-storing microorganisms, at least a portion of the settled sludge is recycled to the first aeration zone and a sufficient portion of the sludge is wasted to maintain the phosphate content of the clarified supernatant below a predetermined level.

In one embodiment, the subsequent aeration zone includes at least one partially submerged rotatable biological contactor which at least partially provides the required aeration of the mixed liquor in that aeration zone.

In another embodiment, the subsequent aeration zone includes a separate tank and aeration of the mixed liquor in the tank is provided by introducing a pressurized oxygen-containing gas into the mixed liquor.

When the wastewater influent contains both phosphorous and nitrogen, the first aeration zone is operated under conditions which, in addition to causing the phosphate-storing microorganisms to be release soluble phosphate into the mixed liquor, also causes at least the majority of the ammonia in the wastewater influent to be nitrified to form nitrates and/or nitrites and to cause such nitrates and/or nitrites to be denitrified to form nitrogen gas.

BRIEF DESCRIPTION OF THE DRAWINGS

FIG. 1 is a schematic and diagrammatic representation of a wastewater treatment system employing the process of the invention which is capable of biologically removing both phosphorous and nitrogen, as well as BOD.

FIG. 2 is a schematic and diagrammatic representation of a wastewater treatment process similar to the once illustrated in FIG. 1 which is more specifically capable of biologically removing phosphorous, as well as BOD.

DESCRIPTION OF THE PREFERRED EMBODIMENTS

While the process can be employed to treat a wide variety of wastewaters, including industrial wastewaters, it is particularly adaptable for treating municipal sewage or wastewater containing unacceptable levels of phosphorous or both phosphorous and nitrogen and will be described in connection with that application.

FIG. 1 illustrates a municipal wastewater treatment system 10 for biologically removing both phosphorous and nitrogen. The treatment system 10 includes a conventional primary treatment step or zone 12 in which untreated wastewater is introduced and treated in a conventional manner to separate settleable and suspended solids by screening and/or sedimentation and the addition of chemicals in some cases to enhance settling of the solids.

Effluent from the primary treatment zone 12 is introduced via a conduit 14 into an elongated RBC tank 16 including an influent end 18 and an effluent end 20. The RBC tank 16 is divided into at least two hydraulically distinct sections or compartments 22 and 24 by a rigid baffle 26 which extends between the side walls of the RBC tank 16 transversely to the flow of wastewater from the influent end 18 toward the effluent end 20. Wastewater flows from the first compartment 22 into the second compartment 24 through a narrow opening 28 beneath the bottom edge of the baffle 26 and the floor 30 of the RBC tank 16. Effluent from the second compartment 24 flows via a conduit 32 into a final settling tank or clarifier 34 in which a clarified effluent 35 is separated from settled solids or sludge 37. The clarified effluent 35 overflows from the clarifier 34 through a conduit 36. A portion of the settled sludge 37 withdrawn from the bottom of the clarifier 34 is recycled by a pump 38 and via a conduit 40 to the first compartment 22 and another portion is discharged to waste via a conduit 42.

Each compartment 22 and 24 includes one or more conventional RBC units 44 including a plurality of large diameter plastic disks 46 mounted in a parallel relationship on a horizontal drive shaft 48 in the usual manner. The disks 46 include means for increasing the available surface for the growth of bacterial, such as a plurality of depressions 50 molded into the surfaces of the disks 46.

While in the process illustrated in FIG. 1, the RBC tank 16 is divided into two hydraulically distinct compartments with three RBC units in the influent or first compartment 22 and one RBC unit in the effluent or second compartment 24, it should be understood that there can be three or more hydraulically distinct compartments and each compartment can include two or more RBC units. The shafts 48 preferably extend generally perpendicularly to the flow direction of wastewater influent through the compartment.

Each RBC unit 44 is rotated by a drive motor (not shown) drivingly connected to the drive shaft 48, by the force of a pressurized oxygen-containing gas, such as air, supplied through a supplemental underwater air source 52, or a combination of both. The RBC units 44 are positioned in the RBC tank 16 so that a portion of the disks 46 is submerged in the wastewater and a portion is exposed to the atmosphere. They preferably are approximately 40–50% submerged, but can be up to 60–70% or more submerged, so long as some portion of the disks 46 are exposed to the atmosphere during rotation. The activated sludge recycled from the final clarifier 34 is mixed with the wastewater in the first compartment 22 to form a mixed liquor.

As the disks 46 are slowly rotated, e.g., 1–3 rpm, organisms present in the wastewater influent and introduced into the first compartment 22 with the recycled activated sludge begin to adhere to the disk surfaces and multiply until the entire surface area of the disks 6 are covered with a layer of a biomass approximately 0.15 to about 0.50 inch thick.

In the first compartment 22, the concentration of suspended solids in the mixed liquor typically is about 1,500 to about 5,000 mg/l and the biomass carried on the disks 46 typically contains equivalent to about 3,200 to about 10,700 mg/l suspended solids. Thus, if the biomass on the disks 46 were removed and placed in the mixed liquor in the first compartment 22, the concentration of suspended solids in the mixed liquor typically would be about 8,200 to about 12,700 mg/l or higher. Stated another way, based on the total suspended solids in the biomass carried on the disks 46 and the mixed liquor, about 39 to about 88% are in the biomass and about 12 to about 61% are in the mixed liquor. Based on biological compensation and equilibrium mechanisms, when concentration of the suspended solids is low, then the fixed film or biomass on the disks is higher and vice versa. This phenomenon maintains an equilibrium between the fixed film and the suspended solids phases.

The amount of biomass carried on the disks 46 in the first compartment 22 is controlled primarily by the amount of activated sludge recycled to the first compartment. The amount of such biomass usually is about 25 to about 50% less than that for conventional, one pass RBC systems. This reduction in organic loading is particularly advantageous for existing RBC systems because it reduces the burden on the shafts and bearings, resulting in extended life and reduced repair costs.

As the disks 46 rotate, a film of wastewater is carried into the ambient air where it trickles down the surface of the disks 38 and absorbs oxygen from the air. Microorganisms in the biomass then remove both dissolved oxygen and organic materials from this film of wastewater. Further removal of dissolved and colloidal organic materials occur as this biomass is rotated through the bulk of the mixed liquor in the first compartment 22. The unused dissolved oxygen is mixed with the mixed liquor to maintain a dissolved oxygen concentration in the mixed liquor. At the same time, organic materials are being absorbed and oxidized with the suspended biomass present in the mixed liquor.

In accordance with the invention, when removal phosphorous or phosphorous and nitrogen is desired, the overall dissolved oxygen content (DO) of the mixed liquor in the first zone or compartment 22 is maintained high enough to promote oxidation of ammonia nitrogen to nitrates and/or nitrites (nitrification), but low enough the promote biological reduction of nitrates and/or nitrites to nitrogen gas (denitrification) which is released to the atmosphere or to a form which is incorporated into the biological cell walls of the suspended biomass so it can be removed with the wasted sludge. The DO of the mixed liquor in the first compartment 22 also is maintained low enough to stress microorganisms in the biomass on the disk 46 and suspended in the mixed liquor capable of storing phosphates under oxidizing conditions and cause them to release biologically bound soluble phosphates into the mixed liquor. The DO of the mixed liquor in a subsequent stage is maintained high enough to promote oxidation of BOD and proliferation of the phosphate-storing microorganism to promote phosphate uptake. Thus, the first stage provides substantial nitrification/denitrification and also serves as a phosphorous stress/release stage for the appropriate bacterial species in the biomass carried on the disks 46 and suspended in the mixed liquor.

While not fully understood at this time, it appears that both nitrification and denitrification can take place in the first compartment 22, even though the overall DO in the mixed liquor is quite low, because nitrification occurs during one phase of disk rotation and denitrification occurs during another phase. Nitrification of the biomass on the disks 46 can occur when it is exposed to oxygen in the atmosphere during rotation of the disk. The rotating disks create a mechanical aeration which draws some air into the mixed liquor and the oxygen in such air causes nitrification in the mixed liquor in close proximity to the disks during one phase of disk rotation. As the biomass is subsequently rotated through the mixed liquor during another phase of disk rotation, denitrification can occur as oxygen in the biomass and in the mixed liquor surrounding the biomass is deleted.

There is a balance between phosphorous removal and nitrification/denitrification in the first stage. Substantially all, or at least a vast majority, of the nitrification/denitrification of the nitrogen most desirably should take place in the first stage so that a minimum amount of free ammonia nitrogen or nitrates and/or nitrites remain in the liquid phase. Otherwise, such remaining nitrogen values can be carried over into the clarified effluent exiting from the final clarifier. To accomplish the desired nitrification/denitrification and phosphorous stress/release in the first stage, the overall DO for the mixed liquor in the first stage is maintained at about 0.3 to 1.5 mg/l, preferably about 0.7 to about 1.1 mg/l.

In the specific process illustrated in FIG. 1, removal of both nitrogen and phosphorous can be maximized by controlling operation of the RBC units 44a, 44b, and 44c in the first compartment 22 (e.g., the rotational speed), the amount of pressurized air or other oxygen-containing gas introduced into the first compartment 22 through underwater headers 54a, 54b and 54c, respectively associated with each RBC unit, and the amount of activated sludge recycled to the first compartment 22 to provide an optimum overall DO in the mixed liquor. The DO in the second stage is controlled primarily by controlling operation of the RBC unit 44d and the amount of pressurized air introduced through underwater header 54b.

The above operating parameters can be controlled so that the DO in the mixed liquor gradually increases as it moves through the first compartment 22. For example, the DO in the region of the RBC units 44a, 44b and 44c can be about 0.6 to about 0.9 mg/l, about 0.9 to about 1.1 mg/l, and about 1.1 to about 1.4 mg/l, respectively.

Because the low DO environment of the mixed liquor in the first compartment 22, volatile fatty acids from the wastewater influent, and possibly some formed in the mixed liquor, are taken up and converted to polyhydroxy butyrate (PHB) by microorganism species such as Acinetobacter. Soluble BOD also occurs in the first compartment 22. In the higher DO environment of the mixed liquor in the second compartment 24, the PHB is oxidized, as orthophosphorous is removed from solution, and becomes bonded with molecules that form granules of phosphate with bacterial cells to produce a phosphate-rich sludge which is collected in the clarifier 34. The phosphates stored in the sludge are removed from the system with sludge wasted through the conduit 42.

To maximize BOD removal and phosphate uptake in the second compartment 24, the overall DO for the mixed liquor therein is maintained above about 1.5 mg/l, preferably above 2 mg/l and most preferably within the range of about 2 to about 4 mg/l.

In some cases, the desired DO in the first compartment can be obtained without introducing air through the header for one or more of the RBC units, particularly the RBC unit 44a. The higher DO level in the second compartment 24 normally requires introduction of air through the header 54d.

If desired, rotation of the RBC units may be assisted or fully effected by directing a portion of the pressurized air required to provide the desired DO through the supplemental air sources 52 as described in Guarino U.S. Pat. No. 4,093,539 which is incorporated herein by reference.

To provide the desired amount of suspended solids in the mixed liquor in the first compartment 22 and the biomass carried on the disks of RBC units 44a, 44b and 44c, the amount of activated sludge recycled to the first compartment 22 usually is about 15 to about 50%, preferably about 25 to about 40% of the wastewater influent introduced into the first compartment 22 through the conduit 14.

If the DO of the sludge collected in the clarifier 34 is below about 1.5 mg/l, the phosphate-storing microorganisms can become stressed in a manner similar to what occurs in the first compartment 22 and release soluble phosphates into the clarified effluent 35. To minimize such an occurrence, the depth of the sludge 37 in the clarifier 35 preferably is maintained below about 2 feet, preferably at about 0.5 to about 1.5 feet. At depths higher than about 3 feet, the DO of the sludge 37 can decrease to a level where soluble phosphates are released.

Even though the process of the invention can be operated to effectively remove both phosphorous and nitrogen, the overall sludge age $$\left( \frac{\text{total biomass or sludge}}{\text{sludge wasted each day}} \right)$$

less than about 9 days and can be as low as about 6.5 to about 8 days. In comparison, the overall sludge age for a conventional activated sludge system operated to remove phosphorous and nitrogen typically is 10 to 15 days.

The process of the invention can be operated so that the influent detention time in the RBC tank 16 is less than about 3 hours and can be as low as about 1 to about 2 hours.

Shorter hydraulic retention time and sludge age have several advantages; the most practical is reduced cost. This process can accomplish the desired results with less land area and less concrete tankage than either conventional activated sludge plants or conventional RBC plants, when nutrient removal is accomplished. When biological nutrient reduction is included, this mode of operation requires less equipment than other conventional (chemical) methods of nutrient reduction, which translates into lower operation and maintenance costs. A plant can be operated more effectively, resulting in lower electrical consumption in some cases and a reduction in land area required. At some wastewater treatment plants this consideration is very important.

A lower sludge age than conventional extended aeration plants usually promotes a better settling sludge, so clarifiers may not require as much surface area and less land required. Also, solids tend to dewater more easily with a younger sludge age.

The combined rotating fixed film/suspended solids process of the invention provides the capability of attracting a diverse microbial culture. The nitrification microbes usually survive longer on fixed film surfaces and can be predominant in the culture of the fixed film. Suspended solids organisms reduce carbonaceous material and utilize oxygen from aeration sources and from nitrate molecules liberated as a result of the oxidation of ammonia compounds in the liquid film carried up into the air phase of treatment on the fixed film in the biological mass on the disks.

There is a dynamic culture of nitrifiers and other organisms on the fixed film, some of which can accomplish phosphorous enrichment. Some of these organisms have a relatively longer life span than the suspended growth organisms, particularly the organisms that nitrify. Nitrifiers in the suspended growth phase may also convert ammonia to nitrites and nitrates if they are in close proximity to an aeration source, such as the rotating media, or supplemental injected aeration. When there is a low DO in the liquid phase, the nitrates are quickly denitrified, whether produced in the air phase of fixed film rotation or in the mixed liquor. Simultaneous nitrification/denitrification has been observed in other type treatment processes. However, with the process of the invention it can occur in a relatively short (6.5 days) sludge age and retention time which is quite surprising and unexpected.

The capability to biologically reduce phosphorous provided by the combined rotating fixed film/suspended growth process of the invention is believed to be unique. The process also is capable of providing high rate biological nutrient removal. The process of the invention can reduce the phosphorous content in the wastewater influent to about 1 or less, reduce the influent BOD to less than 10 ppm and reduce the total nitrogen values to about 10 mg/l or less.

FIG. 2 illustrates another embodiment of the invention which for the most part is the same as the process illustrated in FIG. 1 and is particularly effective in removing phosphorous. Parts of the process common with the process illustrated in FIG. 1 are designated by the same reference numerals.

In this embodiment, the RBC tank 16 is divided into three hydraulically distinct treatment zones or compartments 60, 62 and 64 by baffles 26a and 26b. The first compartment 60 includes two RBC units 44a and 44b, the intermediate compartment 62 includes one RBC unit 44c and the last compartment 64 includes one RBC unit 44d. Operation of the RBC units, the amount of air introduced into each of the compartments 60, 62 and 64 and the amount from recycled sludge are controlled to provide a low DO, a medium DO and high DO, respectively.

Since the primary consideration is removal of phosphorous, the DO of the mixed liquor in both the first compartment 60 and the intermediate compartment 62 is controlled to maximize phosphorous stress/release and aeration/phosphorous enrichment mechanisms. Aeration is controlled in the first compartment to provide maximum stress to the microorganisms and maximize the release of phosphorous which increases the potential uptake of phosphorous. This action/reaction type of response provides the potential for extraordinary amounts of phosphorous to be taken up in the phosphorous enrichment phase of the reaction. The release can occur with DO levels in the mixed liquor below about 1.0 mg/l, but above 0.5 mg/l.

Another factor that enhances the release mechanism is the volatile fatty acid content of the influent into the first compartment. Release of biologically bound phosphorous is produced by enzymatic stimulus of low molecular weight volatile fatty acids, such as acetate, in the presence of dissolved oxygen.

Volatile fatty acids have been found in wastewater influents in concentrations of up to 50 mg/l during experimental studies. Two-stage phosphorous stress/release is not necessary nor necessarily desirable when phosphorous release is stimulated by volatile fatty acids. The three-stage mode illustrated in FIG. 2 maximizes both the stress zone and the uptake zone(s). A strong release in the first stage including two RBC units followed by two aeration zones provides the time and space necessary and available to maximize phosphorous release, while providing an extra phosphorous enrichment zone. The volatile fatty acid introduced into the first zones, followed by two aeration zones, negates the need to stress microorganisms in the bottom of the clarifier 35 or in the return line 40. Thus, there is no reason for an operator to keep phosphorous-rich biomass in the clarifier longer than necessary. If solids are retained in the clarifier 37 too long, phosphorous release can occur as described above.

The overall DO in the first compartment is maintained at about 0.3 to about 1 mg/l, preferably about 0.7 to about 0.9 mg/l and the overall DO in the intermediate compartment 62 is maintained at about 0.7 to about 1.5 mg/l, preferably about 0.9 to about 1.5 mg/l.

The overall DO in the last compartment 64 can be maintained at substantially the same level as compartment 22 in the process illustrated in FIG. 1.

As illustrated by dashed lines in FIGS. 1 and 2, a separate aeration tank 66, disposed between the RBC tank 16 and the final clarifier 34, can be provided for improved phosphate removal. Air or another oxygen-containing gas can be introduced into the aeration tank 66 in any suitable manner, such as by a conventional sparger (not shown). If desired, such an aeration tank can be used in place of a final RBC stage operated at a DO high enough to promote phosphate uptake. That is, such an aeration tank can be used in place of the compartment 24 in the process illustrated in FIG. 1 or the compartment 64 in the process illustrated in FIG. 2. As illustrated by dashed lines in FIGS. 1 and 2, a portion of the recycled sludge can be introduced into the RBC tank at locations downstream of the influent end for entrancement of phosphorous removal and/or nitrification/denitrification.

For instance, there may be applications that require almost total nitrification followed by complete denitrification. To address this scenario, a portion of recycled sludge could be introduced at the influent end of the process to enhance removal of carbonaceous materials and nitrification in a high DO zone. At a downstream zone more recycled sludge may be introduced and aeration adjusted (lowered) so that denitrification predominates to achieve complete destruction of nitrates. A similar step feed of recycled sludge can be advantageous to enhance biological phosphorous enrichment, with proper DO control in both cases.

Examples of such schemes for recycling sludge are illustrated in FIGS. 1 and 2. In the process illustrated in FIG. 1, a portion of the recycled sludge can be introduced at a midpoint of the compartment 22 and/or a portion can introduced into the upstream end of the compartment 24. In the process illustrated in FIG. 2, a portion of the recycled sludge can be introduced at a midpoint of the first compartment 60, and/or the upstream end of the intermediate compartment 62 and/or the upstream end of the final compartment 64.

The process of the invention can provide a number of important advantages. Existing wastewater treatment plants employing RBC units, either partially or substantially fully submerged, can be retrofitted to substantially improve the efficiency of nutrient removal by simply adding the piping, valves, pumps and other auxiliary equipment required to recycle a portion of the sludge to the first aeration zone and waste another portion and possibly the addition of equipment for introducing controlled amounts of pressurized air into the various zones. New RBC treatment plants can be modified to have that capability by including a sludge recycling system in the design. Such a change also can expand the capacity of existing and new RBC treatment plants because of reductions in sludge age and influent detention time. Lower shaft loads resulting from reduced fixed film biomass can increase the working life of the RBC units and reduce repair costs. Use of chemical normally employed in RBC treatment plants can be eliminated or at least the amount substantially reduced. The tankage for new treatment plants can be in the order of 30-50% smaller than that for conventional activated sludge plants, resulting in lower capital costs even though RBC units are employed. It has been found the clarity of the effluent is increased. Waste solids have excellent settling characteristics. Solids can be dewatered and thickened without the addition of chemicals.

From the foregoing description, one skilled in the art can easily ascertain the essential characteristics of the invention and, without departing from the spirit and scope thereof, make various changes and modifications to adapt to various usages.

I claim:

1. A process for treating a BOD-containing wastewater also containing unacceptable levels of phosphorous, nitrogen or mixtures thereof, said process comprising
introducing a wastewater influent and recycled activated sludge into a first aeration zone including at least one partially submerged rotatable biological contactor to produce a mixed liquor and forcibly aerating the mixed liquor by rotating said contactor under conditions whereby the overall dissolved oxygen content of the mixed liquor in said aeration zone is about 0.7 to about 1.5 mg/l so as to cause microorganisms capable of storing phosphates under oxidizing conditions to release soluble phosphates into the mixed liquor;

transferring a mixed liquor from said first aeration zone to a subsequent aeration zone and aerating the mixed liquor therein under conditions whereby the overall dissolved oxygen content of the mixed liquor in said subsequent aeration zone is greater than about 1.5 mg/l so as to cause storing of phosphates by said phosphate-storing microorganisms;

transferring the mixed liquor from said subsequent aeration zone to a settling zone wherein a clarified supernatant liquid is separated from settled sludge containing said phosphate-storing microorganisms;

recycling at least a portion of the settled sludge to said first aeration zone as said recycled sludge; and wasting a sufficient portion of the sludge to maintain the phosphate content of the clarified supernatant below a predetermined level.

2. A process according to claim 1 wherein the overall dissolved oxygen content of the mixed liquor in said first aeration zone is about 0.3 to about 1.5 mg/l.

3. A process according to claim 2 wherein the overall dissolved oxygen content of the mixed liquor in said first aeration zone is about 0.7 to about 1.1 mg/l.

4. A process according to claim 2 wherein the overall dissolved oxygen content of the mixed liquor in said subsequent aeration zone is at least 2 mg/l.

5. A process according to claim 4 wherein the overall dissolved oxygen content of the mixed liquor in said subsequent aeration zone is about 2 to about 4 mg/l.

6. A process according to claim 1 wherein
said subsequent aeration zone includes at least one partially submerged rotatable biological contactor and aeration of the mixed liquor in said subsequent aeration zone is at least partially provided by rotating said contactor.

7. A process according to claim 1 wherein said subsequent aeration zone includes a separate tank and aeration of the mixed liquor in said tank is provided by introducing a pressurized oxygen-containing gas into the mixed liquor.

8. A process according to claim 1 wherein the sludge age is not in excess of about 9 days.

9. A process according to claim 8 wherein the sludge age is about 9 to about 20 days.

10. A process according to claim 1 wherein the total influent detention time in said first and subsequent aeration zones is less than 3 hours.

11. A process according to claim 10 wherein said total influent detention time is about 1 to about 2 hours.

12. A process according to claim 1 wherein
the wastewater influent contains both phosphorous and nitrogen; and said first aeration zone is operated under conditions which, in addition to causing said phosphate-storing microorganisms to be released into the mixed liquor, also causes at least the majority of the ammonia in the wastewater influent to be nitrified to form nitrates and/or nitrites and to cause such nitrates and/or nitrites to be subsequently denitrified to form nitrogen gas.

13. A process according to claim 1 wherein
said first aeration zone comprises a single hydraulically distinct section and includes two or more of said contactors spaced apart in parallel relationship in the direction of the flow of the wastewater influent through said first aeration zone; and said subsequent aeration zone comprises a single hydraulically distinct section and includes at least one of said contactors and aeration of the mixed liquor in said subsequent aeration zone is at least partially provided by rotating said contactor.

14. A process according to claim 1 wherein
said first aeration zone comprises at least two hydraulically distinct sections, a first section including two or more of said contactors spaced apart in parallel relationship in the direction of flow of the wastewater through said first aeration zone and a second section including at least one of said contactors; and said subsequent aeration zone comprises a single hydraulically distinct section including at least one partially submerged biological contactor and aeration of the mixed liquor therein is at least partially provided by rotating said contactor.

* * * * *